(12) United States Patent
Li et al.

(10) Patent No.: US 10,330,964 B2
(45) Date of Patent: Jun. 25, 2019

(54) COLOR CHANGING DEVICE, DISPLAY MODULE, MANUFACTURING METHOD THEREOF AND DISPLAY CONTROL METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Yanqiu Li, Beijing (CN); Hetao Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/928,446

(22) Filed: Mar. 22, 2018

(65) Prior Publication Data

US 2019/0056612 A1 Feb. 21, 2019

(30) Foreign Application Priority Data

Aug. 18, 2017 (CN) .......................... 2017 1 0713350

(51) Int. Cl.
*G02F 1/1335* (2006.01)
*G02F 1/1333* (2006.01)
(Continued)

(52) U.S. Cl.
CPC ...... *G02F 1/13318* (2013.01); *G02F 1/13439* (2013.01); *G02F 1/133514* (2013.01);
(Continued)

(58) Field of Classification Search
CPC .. H01M 4/02; G02F 2202/16; G02F 2202/36; G02F 1/1343; G02F 1/13439; G02F 1/153; G02F 1/1335; G02F 1/133509; G02F 1/133512; G02F 1/133514; G02F 1/155; G02F 1/0305; G02F 1/0121; G02F 1/133; G02F 1/13306; G02F 1/13318; G02F 1/1333; G02F 1/133345; G02F 1/133603; G02F 1/133617; G02F 1/134309; G02F 1/134336; G02F 1/1345; G02F 1/13452; G02F 1/136; G02F 1/23; G02F 2001/133612; G02F 2001/134345;
(Continued)

(56) References Cited

U.S. PATENT DOCUMENTS

2008/0042552 A1* 2/2008 Cok ........................ B82Y 20/00
313/501

* cited by examiner

*Primary Examiner* — Thoi V Duong
(74) *Attorney, Agent, or Firm* — Brooks Kushman P.C.

(57) ABSTRACT

The present disclosure provides a color changing device, a display module, a manufacturing method thereof, and a display control method. The color changing device includes a plurality of color changing blocks and a color control circuit connected to the plurality of color changing blocks and configured to control each color changing block to exhibit a corresponding color. Each color changing block includes a transparent electrode, a transparent insulation layer arranged on the transparent electrode and provided with a groove, gold nanoparticles filled in the groove and electrically connected to the transparent electrode, and a plurality of electrode sheets coated with silver ions and covering the groove. The electrode sheets of different color changing blocks are insulated from each other.

17 Claims, 3 Drawing Sheets

(51) Int. Cl.
*G02F 1/133* (2006.01)
*G02F 1/1343* (2006.01)

(52) U.S. Cl.
CPC .. *G02F 1/133603* (2013.01); *G02F 1/134309* (2013.01); *G02F 1/133512* (2013.01); *G02F 2001/133612* (2013.01); *G02F 2202/16* (2013.01); *G02F 2202/36* (2013.01)

(58) Field of Classification Search
CPC ....... G02F 2001/01791; H01L 51/0048; H01L 51/444; H01L 51/5234; H01L 51/5203; H01L 51/441; H01L 23/528; H01L 27/322; H01L 27/3211; H01L 27/3244; H01L 27/14621; H01L 27/3246; H01L 2251/5369; C23C 16/50; C23C 16/44
See application file for complete search history.

COLOR CHANGING DEVICE, DISPLAY MODULE, MANUFACTURING METHOD THEREOF AND DISPLAY CONTROL METHOD

CROSS-REFERENCE TO RELATED APPLICATION

This application claims priority to Chinese Patent Application No. 201710713350.6 filed on Aug. 18, 2017, which is incorporated herein by reference in its entirety.

TECHNICAL FIELD

The present disclosure relates to the field of display technology, in particular to a color changing device, a display module, a manufacturing method thereof, and a display control method.

BACKGROUND

In the related art, a liquid crystal display device mainly includes an array substrate, a color filter substrate and liquid crystal molecules arranged between the array substrate and the color filter substrate. A plurality of pixel units is arranged in a matrix form in the liquid crystal display device. Each pixel unit consists of three subpixel units in different colors, usually red (R), green (G) and blue (B). As the working time increases, the colors of a red color filter block, a green color filter block and a blue color filter block may be decayed, and thereby a display effect of the liquid crystal display device may be adversely affected.

SUMMARY

In one aspect, the present disclosure provides in some embodiments a color changing device, including a plurality of color changing blocks and a color control circuit connected to the plurality of color changing blocks and configured to control each color changing block to exhibit a corresponding color. Each color changing block includes a transparent electrode, a transparent insulation layer arranged on the transparent electrode and provided with a groove, gold nanoparticles filled in the groove and electrically connected to the transparent electrode, and a plurality of electrode sheets coated with silver ions and covering the groove. The electrode sheets of different color changing blocks are insulated from each other.

In a possible embodiment of the present disclosure, the transparent electrodes of all the color changing blocks are formed into one piece.

In a possible embodiment of the present disclosure, the color control circuit is electrically connected to the transparent electrode and the electrode sheet, and further configured to apply a predetermined voltage between the electrode sheet and the transparent electrode within a corresponding power-on time period in accordance with a color to be exhibited by each color changing block.

In a possible embodiment of the present disclosure, the electrode sheet is made of gel.

In a possible embodiment of the present disclosure, the transparent insulation layer is made of silicon dioxide.

In a possible embodiment of the present disclosure, the color control circuit includes: a power source circuit configured to provide a power source; a plurality of light supplement circuit configured to provide a supplementary light source; a plurality of color sensors; a single chip microcomputer; and a plurality of time controllers. Each color sensor is configured to identify a color and transmit color information about the identified color to the single chip microcomputer. The single chip microcomputer is configured to transmit the color information to a corresponding time controller. The time controller is configured to apply the predetermined voltage between the electrode sheet and the transparent electrode of the corresponding color changing block within the corresponding power-on time period in accordance with the color information received from the single chip microcomputer.

In a possible embodiment of the present disclosure, the light supplement circuits correspond to the color sensors respectively, and each light supplement circuit includes at least one white light-emitting diode (LED) spaced apart from the corresponding color sensor at a predetermined distance.

In another aspect, the present disclosure provides in some embodiments a display module, including an array substrate, a color filter substrate arranged opposite to the array substrate to form a cell, and the above-mentioned color changing device. Transparent electrodes of color changing blocks of the color changing device are arranged on a surface of the color filter substrate away from the array substrate, color sensors of a color control circuit of the color changing device correspond to subpixels of the display module respectively, and the color changing blocks correspond to the subpixels of the display module respectively. Each color sensor is arranged at a light-exiting side of the corresponding subpixel and configured to collect a color of the subpixel.

In a possible embodiment of the present disclosure, the color control circuit of the color changing device includes light supplement circuits corresponding to the color sensors respectively, and each light supplement circuit includes at least a white LED spaced apart from the corresponding color sensor at a predetermined distance.

In yet another aspect, the present disclosure provides in some embodiments a display module, including: a liquid crystal display, the liquid crystal display including an array substrate, a color filter substrate arranged opposite to the array substrate to form a cell, and a liquid crystal layer arranged between the array substrate and the color filter substrate, the liquid crystal display being provided with a plurality of pixel units arranged in a matrix form, each pixel unit including a plurality of subpixel units in different colors, each subpixel including a color filter block arranged on the color filter substrate; a transparent electrode arranged at a side of the color filter substrate away from the array substrate; a plurality of color sensors arranged between the color filter substrate and the transparent electrode, corresponding to the color filter blocks on the color filter substrate respectively, and configured to collect a color of a corresponding subpixel; a transparent insulation layer arranged at a side of the transparent electrode away from the color sensors and provided with grooves corresponding to the color filter blocks on the color filter substrate respectively and spaced apart from each other; gold nanoparticles filled in the grooves and electrically connected to the transparent electrode; a plurality of electrode sheets covering the grooves, coated with silver ions and insulation from each other; a single chip microcomputer; and a plurality of time controllers electrically connected to the transparent electrode and the electrode sheets. Each color sensor is configured to transmit color information about the collected color of each subpixel to the single chip microcomputer. The single chip microcomputer is configured to transmit the color information to the corresponding time controller. Each time controller is configured to apply a predetermined voltage between the transparent electrode and the electrode sheet corresponding to the subpixel within a power-on time period corresponding to the color in accordance with the color information received from the single chip machine.

In a possible embodiment of the present disclosure, the display module further includes a plurality of light supplement circuits corresponding to the color sensors respectively. Each light supplement circuit includes at least one white LED spaced apart from the corresponding color sensor at a predetermined distance.

In a possible embodiment of the present disclosure, the display module further includes a power source circuit configured to provide a power source for the color sensors, the light supplement circuits, the single chip microcomputer and the time controllers.

In a possible embodiment of the present disclosure, the transparent insulation layer is made of silicon dioxide.

In a possible embodiment of the present disclosure, the display module further includes a power source circuit configured to provide a power source for the color sensors, the light supplement circuits and the color control circuit.

In still yet another aspect, the present disclosure provides in some embodiments a method for manufacturing a display module, including steps of: forming a plurality of color changing blocks at a surface of a color filter substrate away from an array substrate, the color changing blocks being spaced apart from each other and corresponding to subpixels of the display module respectively; and forming a color sensor at a light-exiting side of each subpixel. The step of forming the plurality of color changing blocks at the surface of the color filter substrate away from the array substrate includes: forming a transparent electrode at a surface of the color filter substrate away from the array substrate; forming a transparent insulation layer on the transparent electrode and forming a groove in the transparent insulation layer; filing gold nanoparticles into the groove, the gold nanoparticles being electrically connected to the transparent electrode; and forming an electrode sheet coated with silver ions and covering the groove. In the case that an electrochemical reaction occurs, the silver ions on the electrode sheet are capable of being reduced into silver and deposited onto the gold nanoparticles. The electrode sheets of different color changing blocks are insulated from each other.

In a possible embodiment of the present disclosure, the step of forming the transparent electrode at the surface of the color filter substrate away from the array substrate includes forming a transparent conductive film at the surface of the color filter substrate away from the array substrate. The transparent conductive film is shared by the plurality of color changing blocks and serves as the transparent electrode.

In still yet another aspect, the present disclosure provides in some embodiments a display control method for use in the above-mentioned display module, including steps of: collecting, by a color sensor, a color of a subpixel; calculating, by a color control circuit, a power-on time period within which a predetermined voltage is to be applied between a corresponding electrode sheet and a corresponding transparent electrode in accordance with the color collected by the color sensor; and applying, by the color control circuit, the predetermined voltage between the corresponding electrode sheet and the corresponding transparent electrode within the corresponding power-on time period.

DETAILED DESCRIPTION

Figure 1:
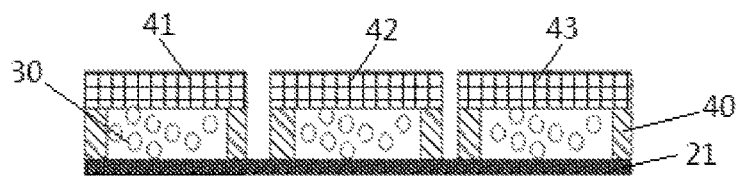
FIG. 1 is a schematic view showing a color changing device according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a color changing device, which includes a plurality of color changing blocks and a color control circuit connected to the plurality of color changing blocks and configured to control each color changing block to exhibit a corresponding color. Each color changing block includes a transparent electrode, a transparent insulation layer arranged on the transparent electrode and provided with a groove, gold nanoparticles filled in the groove and electrically connected to the transparent electrode, and a plurality of electrode sheets coated with silver ions and covering the groove. The electrode sheets of different color changing blocks are insulated from each other.

According to the color changing device in the embodiments of the present disclosure, it is able to control the corresponding color changing block to display the corresponding color through the color control circuit, so as to prevent a display effect from being adversely affected due to color decay of a color filter block.

In a possible embodiment of the present disclosure, in the case that an electrochemical reaction occurs, the silver ions on the electrode sheet may be reduced into silver and deposited onto the gold nanoparticles. Along with an increase in a thickness of a silver housing, a color of the gold nanoparticle may change from red to green and finally to blue. The thickness of the silver housing may be controlled merely by controlling a power-on time period of the electrochemical reaction, and thereby the color to be exhibited by each color changing block may be controlled. According to the color changing device in the embodiments of the present disclosure, through adjusting the power-on time period of the electrochemical reaction, it is able for each color changing block to exhibit the color identical to that of the corresponding subpixel and achieve a light superposition effect, thereby to improve the brightness of the color to be exhibited by a display device and prevent the display effect from being adversely affected by the color decay of the color filter block.

To be specific, the transparent electrodes of all the color changing blocks are formed into one piece.

In a possible embodiment of the present disclosure, the color control circuit is electrically connected to the transparent electrode and the electrode sheet, and further configured to apply a predetermined voltage between the electrode sheet and the transparent electrode within the power-on time period corresponding to the color, so as to adjust the power-on time period of the electrochemical reaction.

In a possible embodiment of the present disclosure, the electrode sheet is made of gel.

In a possible embodiment of the present disclosure, the transparent insulation layer is made of silicon dioxide.

As shown in FIG. 1, the color changing device includes an indium tin oxide (ITO) layer 21 (i.e., a one-piece transparent electrode shared by all the color changing blocks). A silicon dioxide layer 40 is formed on the ITO layer 21, and then a plurality of concaves are formed in rows in the silicon dioxide layer 40 covering the ITO layer 21 through etching, i.e., the grooves are formed in the silicon dioxide layer 40. For convenience, FIG. 1 merely shows three grooves for one pixel unit. It should be appreciated that, the other pixel units may have a similar structure. The gold nanoparticles 30 are filled in the grooves and electrically connected to the ITO layer 21. For the three grooves in FIG. 1, a first electrode sheet 41 coated with the silver ions covers the left groove, a second electrode sheet 42 coated with the silver ions covers the middle groove, and a third electrode sheet 43 coated with the silver ions covers the right groove. Similarly, this structure may be repeated in the plurality of color changing blocks, i.e., the grooves of the color changing blocks may be covered by the electrode sheets corresponding to different colors, and the other pixel units may have a similar structure. The structure of the color control circuit will be described hereinafter in conjunction with the drawings.

In the case that the electrochemical reaction occurs, the silver ions on the first electrode sheet 41 may be reduced into silver and deposited onto the gold nanoparticles filled in the corresponding groove, the silver ions on the second electrode sheet 42 may be reduced into silver and deposited onto the gold nanoparticles filled in the corresponding groove, and the silver ions on the third electrode sheet 43 may be reduced into silver and deposited onto the gold nanoparticles filled in the corresponding groove. The first electrode sheet 41, the second electrode sheet 42 and the third electrode sheet 43 are insulated from each other.

In a possible embodiment of the present disclosure, the first electrode sheet 41, the second electrode sheet 42 and the third electrode sheet 43 may each be made of, but not limited to, gel.

The present disclosure further provides in some embodiments a display module, which includes an array substrate, a color filter substrate arranged opposite to the array substrate to form a cell, a color control circuit, a plurality of color sensors and a plurality of color changing blocks arranged at a surface of the color filter substrate away from the array substrate. The color sensors correspond to subpixels of the display module respectively, and the color changing blocks correspond to the subpixels respectively. Each color sensor is arranged at a light-exiting side of the corresponding subpixel and configured to collect a color of the subpixel. The color control circuit is configured to control the corresponding color changing block to exhibit the color in accordance with the color collected by the color sensor. Each color changing block includes: a transparent electrode arranged at the surface of the color filter substrate away from the array substrate; a transparent insulation layer arranged on the transparent electrode and provided with a groove; gold nanoparticles filled in the groove and electrically connected to the transparent electrode; and an electrode sheet coated with silver ions and covering the groove. In the case that an electrochemical reaction occurs, the silver ions on the electrode sheet are reduced into silver and deposited onto the gold nanoparticles. The electrode sheets of different color changing blocks are insulated from each other.

According to the display module in the embodiments of the present disclosure, the color of the corresponding subpixel may be collected by the color sensor at the light-exiting side of the subpixel, and the corresponding color changing block may be controlled by the color control circuit to exhibit the color, so as to prevent the display effect from being adversely affected by the color decay of the color filter block.

In the embodiments of the present disclosure, a power-on time period of the electrochemical reaction may be controlled through the color control circuit, so as to control a thickness of a silver housing, thereby to control the color to be exhibited by each color changing block. As a result, it is able for each color changing block to exhibit the color identical to that of the corresponding subpixel and achieve a light superposition effect, thereby to improve the brightness of the color to be exhibited by a display device and prevent the display effect from being adversely affected by the color decay of the color filter block.

In a possible embodiment of the present disclosure, the transparent electrodes of the all the color changing blocks may be formed into one piece, i.e., the transparent electrodes may share an identical transparent conductive layer. Of course, in some other possible embodiments of the present disclosure, the transparent electrodes of the different color changing blocks may be separated from each other.

In a possible embodiment of the present disclosure, the transparent conductive layer may be, but not limited to, an ITO layer.

Figure 2:
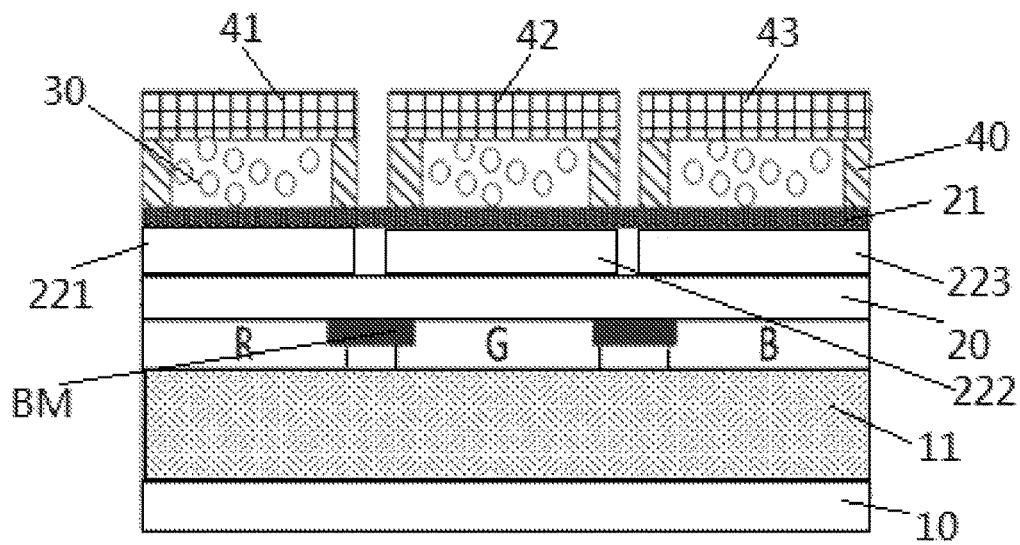
FIG. 2 is a schematic view showing a display module according to one embodiment of the present disclosure.

In FIG. 2, one pixel unit is taken as an example, where 10 represents the array substrate, 11 represents a liquid crystal layer, R represents a red color filter block, G represents a green color filter block, B represents a blue color filter block, 20 represents the color filter substrate, and 21 represents the ITO layer. A black matrix BM is arranged between the red color filter block R and the green color filter block G, and also a black matrix is arranged between the green color filter block G and the blue color filter block B. Three color sensors are arranged between the color filter substrate 20 and the ITO layer 21, i.e., a first color sensor 221 corresponding to the red color filter block R, a second color sensor 222 corresponding to the green color filter block G and a third color sensor 223 corresponding to the blue color filter block B. A silicon dioxide layer 40 is formed on the ITO layer 21, and a plurality of concaves are formed in rows in the silicon dioxide layer 40 covering the ITO layer 21 through etching, i.e., the grooves are formed in the silicon dioxide layer 40. FIG. 2 shows three grooves, and each groove corresponds to one subpixel. The gold nanoparticles 30 are filled in the grooves and electrically connected to the ITO layer 21. The first electrode sheet 41 coated with the silver ions covers the left groove, the second electrode sheet 42 coated with the silver ions covers the middle groove, and the third electrode sheet 43 coated with the silver ions covers the right groove. Then, a package operation is performed. The structure of the color control circuit will be described hereinafter in conjunction with the drawings.

In the case that the electrochemical reaction occurs, the silver ions on the first electrode sheet 41 may be reduced into silver and deposited onto the gold nanoparticles filled in the corresponding groove, the silver ions on the second electrode sheet 42 may be reduced into silver and deposited onto the gold nanoparticles filled in the corresponding groove, and the silver ions on the third electrode sheet 43 may be reduced into silver and deposited onto the gold nanoparticles filled in the corresponding groove. The first electrode sheet 41, the second electrode sheet 42 and the third electrode sheet 43 are insulated from each other.

In a possible embodiment of the present disclosure, the first electrode sheet 41, the second electrode sheet 42 and the third electrode sheet 43 may each be made of, but not limited to, gel.

In the embodiments of the present disclosure, the ITO layer is formed at a back surface of the color filter substrate of a liquid crystal display panel, and the plurality of color sensors corresponding to the subpixels respectively is arranged between the ITO layer and the color filter substrate (in a possible embodiment of the present disclosure, the color sensors may also be formed within the ITO layer, i.e., positions of the color sensors will not be particularly defined herein, as long as they are arranged at the light-exiting side of the corresponding subpixels). Then, the silicon dioxide layer is formed on the ITO layer. Next, the plurality of concaves is formed in the silicon dioxide layer through etching. Next, the gold (Au) nanoparticles having different particle sizes are sputtered in accordance with the practical need using argon (Ar) atoms, so as to enable the gold nanoparticles to be grown in the concaves. Next, the color changing blocks corresponding to the red color filter block R, the green color filter block G and the blue color filter block B are coated with the gel electrode sheets containing the silver ions, and finally a packaging operation is performed. At this time, the gold nanoparticles merely exhibit a red color. In a packaged loop formed by the gel electrode sheet, the gold nanoparticles and the ITO layer, the silver ions may be reduced into metal silver through the electrochemical reaction, and then deposited onto a surface of each gold nanoparticle. Along with an increase in a thickness of a silver housing, the gold nanoparticle may be changed from red to green and finally to blue. The thickness of the silver housing may be controlled merely by controlling the power-on time period of the electrochemical reaction, and thereby the color to be exhibited by each color changing b lock may be controlled correspondingly. According to the embodiments of the present disclosure, through adjusting the power-on time period of the electrochemical reaction, it is able for each color changing block to exhibit the color identical to that of the corresponding subpixel and achieve a light superposition effect, thereby to improve the brightness of the color to be exhibited by the display device.

In a possible embodiment of the present disclosure, the color control circuit may be electrically connected to the plurality of color sensors, and configured to receive color information about the color collected by the color sensor. The color control circuit may be further electrically connected to the transparent electrode and the electrode sheet, and further configured to apply the predetermined voltage between the corresponding electrode sheet and the corresponding transparent electrode within the corresponding power-on time period in accordance with the color collected by the color sensor corresponding to the subpixel, so as to enable the corresponding color changing block to change its color.

In a possible embodiment of the present disclosure, one end of each electrode sheet coated with the silver ions and covering the groove is connected to a single chip microcomputer (which may be included in the color control circuit). The single chip microcomputer may be configured to control the power-on time period through a voltage applied to the electrode sheet. In another possible embodiment of the present disclosure, the electrode sheet may be made of, but not limited to, gel.

In the case that light is transmitted in a solid, usually its intensity may be attenuated and the absorption of the light is associated with the light intensity. As an absorption coefficient, a is used to represent an exponential attenuation rule of the light transmitted in the solid. As an extinction coefficient, K is also used to represent an adsorption capability of a substance. K and a may meet the following equation: $\alpha = 2\omega K/c = 4\pi K/\lambda_0$, where $\lambda_0$ represents an optical wavelength in vacuum, $\omega$ represents an angular frequency of an incident light beam, and c represents a velocity of light.

A reciprocal of the absorption coefficient $\alpha$ is just a penetration depth d of the light in the solid, and $d = 1/\alpha = \lambda_0/(4\pi K)$.

For a medium having a large extinction coefficient, the penetration depth of the light is shallow (short), which represents the absorption capability of the medium is large, and the penetration depth of the light with a long wavelength is larger than that of the light with a short wavelength.

The absorption coefficient $\alpha$ of the gold nanoparticle may be calculated through the following equation:

$$\alpha = K\varepsilon_m^{3/2}\frac{\omega}{c}\left(\frac{4\pi}{3}\right)r^3\frac{\varepsilon_2}{(\varepsilon_1 + 2\varepsilon_m)^2 + \varepsilon_2^2},$$

where K represents the extinction coefficient, $\varepsilon_m$ represents a dielectric constant of a surrounding medium, $\varepsilon_1$ and $\varepsilon_2$ represent a real part and a virtual part of the dielectric constant, $\omega$ represents the angular frequency of the incident light beam, and r represents a radius of the gold nanoparticle. Contributions of free electrons in a metal to $\varepsilon_1$ and $\varepsilon_2$ may be expressed respectively as:

$$\varepsilon_1 = 1 - \frac{\omega_N^2}{(\omega^2 + \gamma^2)} \text{ and } \varepsilon_2 = \frac{\omega_N^2}{\omega(\omega^2 + \gamma^2)},$$

where γ represents a damping coefficient independent of a frequency, $\omega_N$ represents a plasmon frequency of the free electron. $\omega_N$ may be calculated through the following equation:

$$\omega_N = \left(\frac{N_e e^2}{\varepsilon_0 m_e^*}\right)^{1/2},$$

where Ne represents a concentration of free carriers, ε represents a quantity of electric charges of the electron, $\varepsilon_0$ represents a vacuum dielectric constant, and $m_e^*$ represents an electron mass.

Through the above equations, it is able to adjust the radius of the gold nanoparticle in accordance with the desired wavelength of the light.

Figure 3:
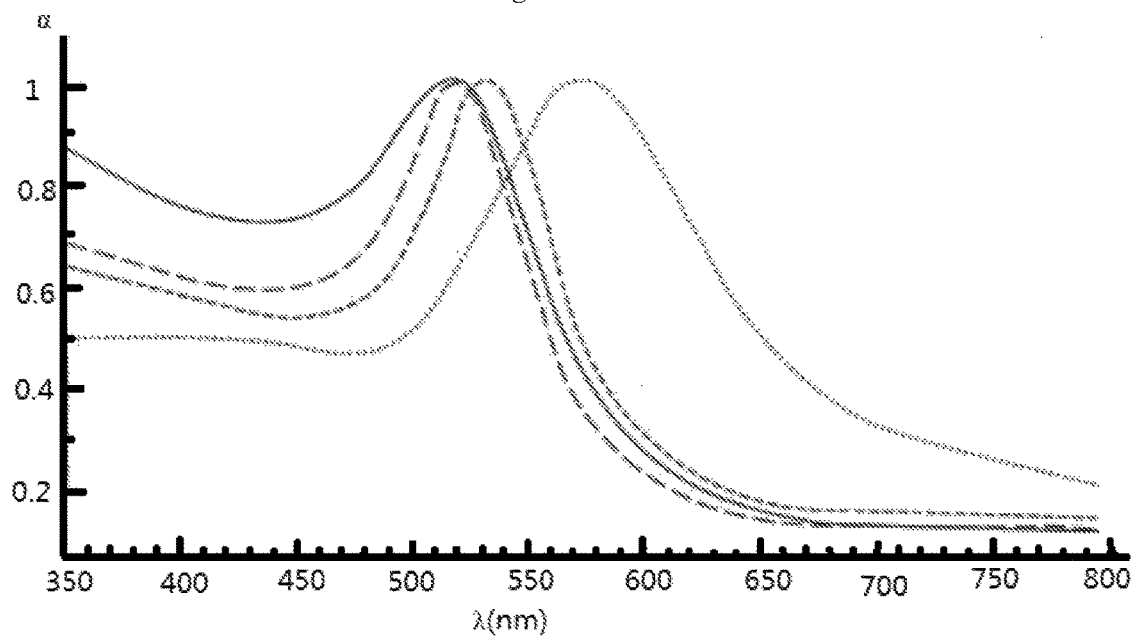
FIG. 3 is a curve diagram showing relationships between an absorption coefficient $\alpha$ and a wavelength $\lambda$ in the case that a gold nanoparticle has different diameters.

FIG. 3 is a curve diagram showing the relationships between the absorption coefficients α and the wavelength λ in the case that the gold nanoparticles have different diameters. A red light beam has a wavelength of 610 nm to 750 nm, a green light beam has a wavelength of 500 nm to 560 nm, and a blue light beam has a wavelength of 400 nm to 480 nm. Through the above-mentioned equations in conjunction with FIG. 3, it is able to determine the diameter of the gold nanoparticle, so as to enable the gold nanoparticle to exhibit a predetermined color. In FIG. 3, a first curve, a second curve, a third curve and a fourth curve, whose crests are sequentially arranged from left to right, correspond to the gold nanoparticles with diameters of 9 nm, 22 nm, 48 nm and 99 nm respectively.

Figure 4:
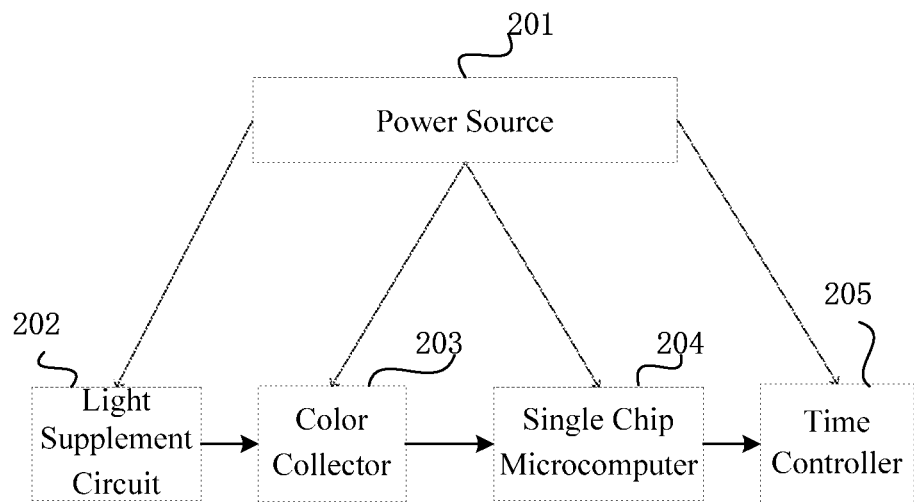
FIG. 4 is a schematic view showing a color control circuit of the display module according to one embodiment of the present disclosure.

In the case that the liquid crystal display device is turned on, a voltage may be applied to the ITO layer at the back surface of the color filter substrate, and then the color control circuit may be started. In a possible embodiment of the present disclosure, as shown in FIG. 4, the color control circuit includes five parts, i.e., a power source circuit 201, a light supplement circuit 202 including four white LEDs, a color collector 203, a single chip microcomputer 204, and a time controller 205. The color collector includes the color sensors (in a possible embodiment of the present disclosure, each color sensor has a type of TCS230), i.e., the color sensors under the ITO layer may be enabled to detect the colors R, G and B. A color identification procedure will be described hereinafter.

At first, an initialization operation may be performed, and then the light supplement circuit 202 including one or more, e.g., 4, white LEDs may detect whether or not white-light balance adjustment needs to be performed. The light supplement circuit 202 may include four white LEDs as a supplementary light source, and these four white LEDs may surround the color sensor TCS230 (in a possible embodiment of the present disclosure, the color sensor TCS230 and the light supplement circuit 202 may be arranged between the color filter substrate 20 and the ITO layer 21), so as to enable a to-be-detected object to be irradiated evenly by the light beams from the light supplement circuit 202, thereby to reduce a measurement error. If necessary, the white-light balance adjustment may be performed, otherwise whether or not the color is to be identified may be detected. In the case that it is unnecessary to identify the color, the color identification procedure may be ended. In the case that it is necessary to identify the color, a color identification program may be called, and the color sensor TCS230 may start to work. Photodiodes of four types are integrated into a chip of the color sensor TCS230. There are totally 64 photodiodes, and each type includes 16 photodiodes. The filters in red, green and blue are embedded into surfaces of three types of the photodiodes, and no filters are embedded into surfaces of the remaining type of the photodiodes. These four types of photodiodes may be arranged alternately in the chip of the color sensor TCS230, so as to receive the light evenly and remarkably reduce the measurement error due to the uneven light, thereby to improve the color identification accuracy.

Figure 5:
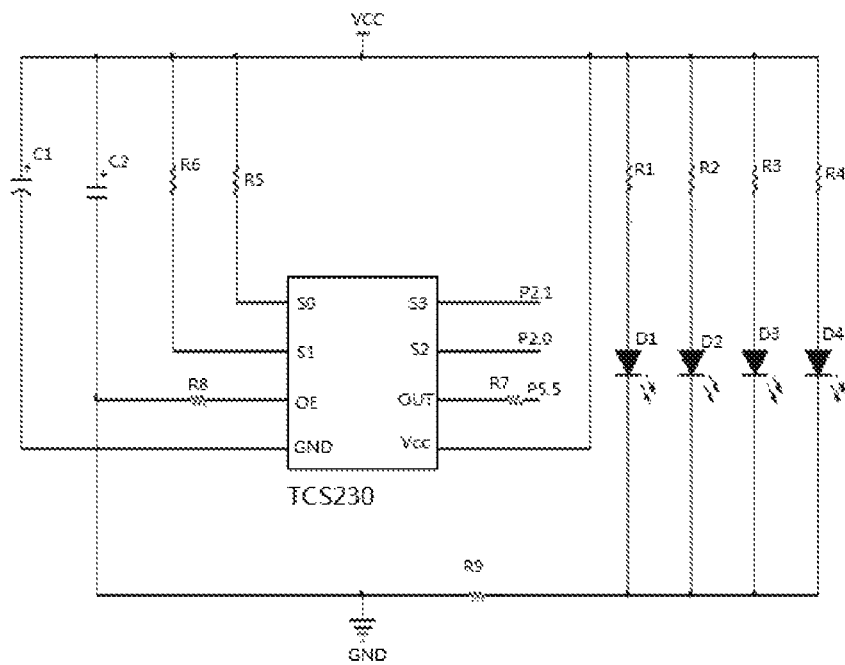
FIG. 5 is a circuit diagram of the color control circuit including color sensors and light supplement circuits according to one embodiment of the present disclosure.

During the operation, as shown in FIG. 5, the color sensor TCS230 is connected to a pin P2.1 of the single chip microcomputer (in a possible embodiment of the present disclosure, the single chip microcomputer may have a type of STC89C52) via a pin 3, connected to a pin P2.0 of the single chip microcomputer via a pin S2, and connected to a pin P3.5 of the single chip microcomputer via a pin OUT (a seventh resistor R7 is connected between OUT and P3.5). A pin S0 of the color sensor TCS230 is connected to a high level input end VCC (in a possible embodiment of the present disclosure, the high level input end VCC may output a voltage of +5V) via a fifth resistor R5, a pin S1 of the color sensor TCS230 is connected to the high level input end VCC via a sixth resistor R6, a pin OE of the color sensor TCS230 is connected to the high level input end VCC via an eighth resistor R8 and a second capacitor C2 connected in series with each other (one end of the eighth resistor R8 connected to the second capacitor C2 is further connected to a ground end GND), a pin GND of the color sensor TCS230 is connected to the high level input end via a first capacitor C1, and a pin Vcc of the color sensor TCS230 is connected to the high level input end VCC. In FIG. 5, D1 represents a first white LED of the light supplement circuit, D2 represents a second white LED of the light supplement circuit, D3 represents a third white LED of the light supplement circuit, and D4 represents a fourth white LED of the light supplement circuit, R1 represents a first resistor, R2 represents a second resistor, R3 represents a third resistor, R4 represents a fourth resistor, and R9 represents a ninth resistor. In a possible embodiment of the present disclosure, R5 and R6 may each have a resistance of 10KΩ, R1, R2, R3 and R4 may each have a resistance of 20 KΩ, C1 may have a capacitance of 10 μF, and C2 may have a capacitance of 0.2 μF.

In a possible embodiment of the present disclosure, a type of the filter may be selected in accordance with intensities of signals applied to the pin S2 and the pin S3, and an output frequency scaling ratio may be selected in accordance with intensities of signals applied to the pin S0 and the pin S1, as shown in the following table.

| S0 | S1 | Output frequency scaling ratio | S2 | S3 | Type of filter |
|---|---|---|---|---|---|
| low | low | turning off power source | low | low | red |
| low | high | 2% | low | high | blue |
| high | low | 20% | high | low | None |
| high | high | 100% | high | high | green |

In the case that the color sensor TCS230 merely includes one type of filters, the light in a certain color may be allowed to pass therethrough, and the light in the other colors may be shielded. At this time, the color sensor TCS230 has already identified color information, and may transmit the identified color information to the single chip microcomputer. The single chip microcomputer may then transmit the identified color information to the time controller. Next, the time controller may control an electro-oxidation/reduction time period of the gold nanoparticles in accordance with the color information from the single chip microcomputer, so as to enable a color of each gold nanoparticle to match the color contained in the color information and output the color of the filter. The output frequency scaling ratio may be selected by the color sensor TCS230 through the pin S0 and the pin S1, and an output frequency is within the range of 2 Hz to 500 kHz. Here, the time controller may be a known device or a circuit formed by conventional electronic elements in accordance with the practical need.

In a possible embodiment of the present disclosure, the display module may further include a plurality of light supplement circuits, and each light supplement circuit corresponds to one of the color sensors. Each light supplement circuit includes at least one white LED spaced apart from the corresponding color sensor at a predetermined distance, so as to enable the light beam from the white LED to reach the color sensor, thereby to reduce the measurement error. Here, the predetermined distance may be set in accordance with the practical need, as long as the light beam from the white LED is capable of reaching the color sensor.

To be specific, the display module further includes a power source circuit configured to provide a power source for the color sensors, the light supplement circuits and the color control circuit.

To be specific, the electrode sheet may be made of gel.

The present disclosure further provides in some embodiments a display module, which includes: a liquid crystal display, the liquid crystal display including an array substrate, a color filter substrate arranged opposite to the array substrate to form a cell, and a liquid crystal layer arranged between the array substrate and the color filter substrate, the liquid crystal display being provided with a plurality of pixel units arranged in a matrix form, each pixel unit consisting of a plurality of subpixel units in different colors, each subpixel including a color filter block arranged on the color filter substrate; a transparent electrode arranged at a side of the color filter substrate away from the array substrate; a plurality of color sensors arranged between the color filter substrate and the transparent electrode, corresponding to the color filter blocks on the color filter substrate respectively, and configured to collect a color of a corresponding subpixel; a transparent insulation layer arranged at a side of the transparent electrode away from the color sensors and provided with grooves corresponding to the color filter blocks on the color filter substrate respectively and spaced apart from each other; gold nanoparticles filled in the grooves and electrically connected to the transparent electrode; a plurality of electrode sheets covering the grooves respectively, coated with silver ions and insulation from each other; a single chip microcomputer; and a plurality of time controllers electrically connected to the transparent electrode and the electrode sheets. Each color sensor is configured to transmit color information about the collected color of each subpixel to the single chip microcomputer. The single chip microcomputer is configured to transmit the color information to the corresponding time controller. Each time controller is configured to apply a predetermined voltage between the transparent electrode and the electrode sheet corresponding to the subpixel within a power-on time period corresponding to the color in accordance with the color information received from the single chip machine.

In a possible embodiment of the present disclosure, the display module further includes a plurality of light supplement circuits corresponding to the color sensors respectively. Each light supplement circuit includes at least one white LED spaced apart from the corresponding color sensor at a predetermined distance.

In a possible embodiment of the present disclosure, the display module further includes a power source circuit configured to provide a power source for the color sensors, the light supplement circuits, the single chip microcomputer and the time controllers.

In a possible embodiment of the present disclosure, the transparent insulation layer is made of silicon dioxide.

The present disclosure further provides in some embodiments a method for manufacturing a display module, which includes steps of: forming a plurality of color changing blocks at a surface of a color filter substrate away from an array substrate, the color changing blocks being spaced apart from each other and corresponding to subpixels of the display module respectively; and forming a color sensor at a light-exiting side of each subpixel. The step of forming the plurality of color changing blocks at the surface of the color filter substrate away from the array substrate includes: forming a transparent electrode at a surface of the color filter substrate away from the array substrate; forming a transparent insulation layer on the transparent electrode and forming a groove in the transparent insulation layer; filing gold nanoparticles into the groove, the gold nanoparticles being electrically connected to the transparent electrode; and forming an electrode sheet coated with silver ions and covering the groove. In the case that an electrochemical reaction occurs, the silver ions on the electrode sheet are capable of being reduced into silver and deposited onto the gold nanoparticles. The electrode sheets of different color changing blocks are insulated from each other.

According to the method in the embodiments of the present disclosure, the plurality of color changing blocks spaced apart from each other are formed at the surface of the color filter substrate away from the array substrate, and each color sensor is arranged at the light-exiting of the corresponding subpixel. As a result, it is able for the color sensor of the display module to collect the color of the corresponding subpixel and exhibit the color through the corresponding color changing block, thereby to prevent the display effect from being adversely affected by the color decay of the color filter block.

To be specific, the step of forming the transparent electrode at the surface of the color filter substrate away from the array substrate includes forming a transparent conductive film at the surface of the color filter substrate away from the array substrate. The transparent conductive film is shared by the plurality of color changing blocks and serves as the transparent electrode.

Figure 6:
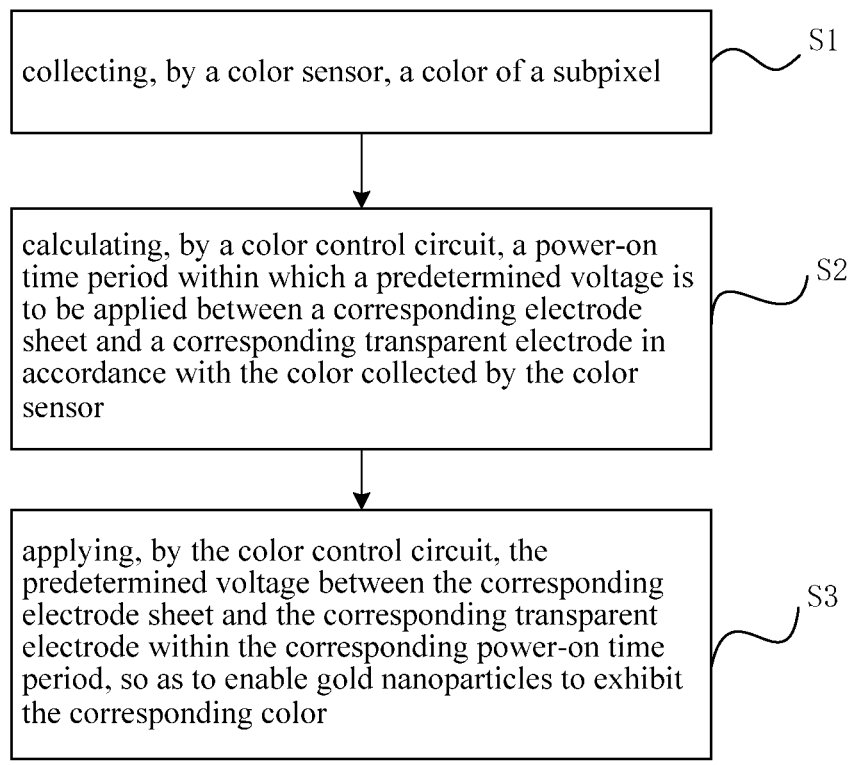
FIG. 6 is a flow chart of a display control method for the display module according to one embodiment of the present disclosure.

The present disclosure further provides in some embodiments a display control method for use in the above-mentioned display module. As shown in FIG. 6, the display control method includes: Step S1 of collecting, by a color sensor, a color of a subpixel; Step S2 of calculating, by a color control circuit, a power-on time period within which a predetermined voltage is to be applied between a corresponding electrode sheet and a corresponding transparent electrode in accordance with the color collected by the color sensor; and Step S3 of applying, by the color control circuit, the predetermined voltage between the corresponding electrode sheet and the corresponding transparent electrode within the corresponding power-on time period, so as to enable gold nanoparticles to exhibit the corresponding color.

According to the display control method in the embodiments of the present disclosure, the color of the corresponding subpixel may be collected by the color sensor at the light-exiting side of the subpixel, and the corresponding color changing block may exhibit the color under the control of the color control circuit. As a result, it is able to prevent the display effect from being adversely affected by the color decay of the color filter block.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A color changing device, comprising a plurality of color changing blocks and a color control circuit connected to the plurality of color changing blocks and configured to control each color changing block to exhibit a corresponding color, wherein
    each color changing block comprises a transparent electrode, a transparent insulation layer arranged on the transparent electrode and provided with a groove, gold nanoparticles filled in the groove and electrically connected to the transparent electrode, and a plurality of electrode sheets coated with silver ions and covering the groove; and
    the electrode sheets of different color changing blocks are insulated from each other.

2. The color changing device according to claim 1, wherein the transparent electrodes of all the color changing blocks are formed into one piece.

3. The color changing device according to claim 1, wherein the color control circuit is electrically connected to the transparent electrode and the electrode sheet, and further configured to apply a predetermined voltage between the electrode sheet and the transparent electrode within a corresponding power-on time period in accordance with a color to be exhibited by each color changing block.

4. The color changing device according to claim 3, wherein the color control circuit comprises:
    a power source circuit configured to provide a power source;
    a plurality of light supplement circuit configured to provide a supplementary light source;
    a plurality of color sensors;
    a single chip microcomputer; and
    a plurality of time controllers,
    wherein each color sensor is configured to identify a color and transmit color information about the identified color to the single chip microcomputer,
    the single chip microcomputer is configured to transmit the color information to a corresponding time controller, and
    the time controller is configured to apply the predetermined voltage between the electrode sheet and the transparent electrode of the corresponding color changing block within the corresponding power-on time period in accordance with the color information received from the single chip microcomputer.

5. The color changing device according to claim 4, wherein the light supplement circuits correspond to the color sensors respectively, and each light supplement circuit comprises at least one white light-emitting diode (LED) spaced apart from the corresponding color sensor at a predetermined distance.

6. A display module, comprising an array substrate, a color filter substrate arranged opposite to the array substrate to form a cell, and the color changing device according to claim 4, wherein transparent electrodes of color changing blocks of the color changing device are arranged on a surface of the color filter substrate away from the array substrate;
    color sensors of a color control circuit of the color changing device correspond to subpixels of the display module respectively;
    the color changing blocks correspond to the subpixels of the display module respectively; and
    each color sensor is arranged at a light-exiting side of the corresponding subpixel and configured to collect a color of the subpixel.

7. The display module according to claim 6, wherein the color control circuit of the color changing device comprises light supplement circuits corresponding to the color sensors respectively, and each light supplement circuit comprises at least a white Light-Emitting Diode (LED) spaced apart from the corresponding color sensor at a predetermined distance.

8. A display control method for the display module according to claim 6, comprising steps of:
    collecting, by a color sensor, a color of a subpixel;
    calculating, by a color control circuit, a power-on time period within which a predetermined voltage is to be applied between a corresponding electrode sheet and a corresponding transparent electrode in accordance with the color collected by the color sensor; and
    applying, by the color control circuit, the predetermined voltage between the corresponding electrode sheet and the corresponding transparent electrode within the corresponding power-on time period.

9. The color changing device according to claim 1, wherein the electrode sheet is made of gel.

10. The color changing device according to claim 1, wherein the transparent insulation layer is made of silicon dioxide.

11. A display module, comprising:
    a liquid crystal display, the liquid crystal display comprising an array substrate, a color filter substrate arranged opposite to the array substrate to form a cell, and a liquid crystal layer arranged between the array substrate and the color filter substrate, the liquid crystal display being provided with a plurality of pixel units arranged in a matrix form, each pixel unit comprising a plurality of subpixel units in different colors, each subpixel comprising a color filter block arranged on the color filter substrate;
    a transparent electrode arranged at a side of the color filter substrate away from the array substrate;
    a plurality of color sensors arranged between the color filter substrate and the transparent electrode, corresponding to the color filter blocks on the color filter substrate respectively, and configured to collect a color of a corresponding subpixel;
    a transparent insulation layer arranged at a side of the transparent electrode away from the color sensors and provided with grooves corresponding to the color filter blocks on the color filter substrate respectively and spaced apart from each other;
    gold nanoparticles filled in the grooves and electrically connected to the transparent electrode;
    a plurality of electrode sheets covering the grooves, coated with silver ions and insulation from each other;
    a single chip microcomputer; and
    a plurality of time controllers electrically connected to the transparent electrode and the electrode sheets, wherein each color sensor is configured to transmit color information about the collected color of each subpixel to the single chip microcomputer, the single chip microcomputer is configured to transmit the color information to the corresponding time controller, and each time controller is configured to apply a predetermined voltage between the transparent electrode and the electrode sheet corresponding to the subpixel within a power-on time period corresponding to the color in accordance with the color information received from the single chip machine.

12. The display module according to claim 11, further comprising a plurality of light supplement circuits corresponding to the color sensors respectively, wherein each light supplement circuit comprises at least one white Light-Emitting Diode (LED) spaced apart from the corresponding color sensor at a predetermined distance.

13. The display module according to claim 11, further comprising a power source circuit configured to provide a power source for the color sensors, the light supplement circuits, the single chip microcomputer and the time controllers.

14. The display module according to claim 11, wherein the transparent insulation layer is made of silicon dioxide.

15. A display control method for the display module according to claim 11, comprising steps of:
collecting a color of a subpixel;
calculating a power-on time period within which a predetermined voltage is to be applied between a corresponding electrode sheet and a corresponding transparent electrode in accordance with the color; and
applying the predetermined voltage between the corresponding electrode sheet and the corresponding transparent electrode within the corresponding power-on time period.

16. A method for manufacturing a display module, comprising steps of:
forming a plurality of color changing blocks at a surface of a color filter substrate away from an array substrate, the color changing blocks being spaced apart from each other and corresponding to subpixels of the display module respectively; and
forming a color sensor at a light-exiting side of each subpixel,
wherein the step of forming the plurality of color changing blocks at the surface of the color filter substrate away from the array substrate comprises:
forming a transparent electrode at a surface of the color filter substrate away from the array substrate;
forming a transparent insulation layer on the transparent electrode and forming a groove in the transparent insulation layer;
filling gold nanoparticles into the groove, the gold nanoparticles being electrically connected to the transparent electrode; and
forming an electrode sheet coated with silver ions and covering the groove,
wherein in the case that an electrochemical reaction occurs, the silver ions on the electrode sheet are capable of being reduced into silver and deposited onto the gold nanoparticles, and
the electrode sheets of different color changing blocks are insulated from each other.

17. The method according to claim 16, wherein the step of forming the transparent electrode at the surface of the color filter substrate away from the array substrate comprises forming a transparent conductive film at the surface of the color filter substrate away from the array substrate, and the transparent conductive film is shared by the plurality of color changing blocks and serves as the transparent electrode.

* * * * *